Nov. 29, 1949 R. H. BEACH Re. 23,170
MEANS FOR ARRESTING CAVITATION
IN OPERATION OF PUMPS
Original Filed March 8, 1944
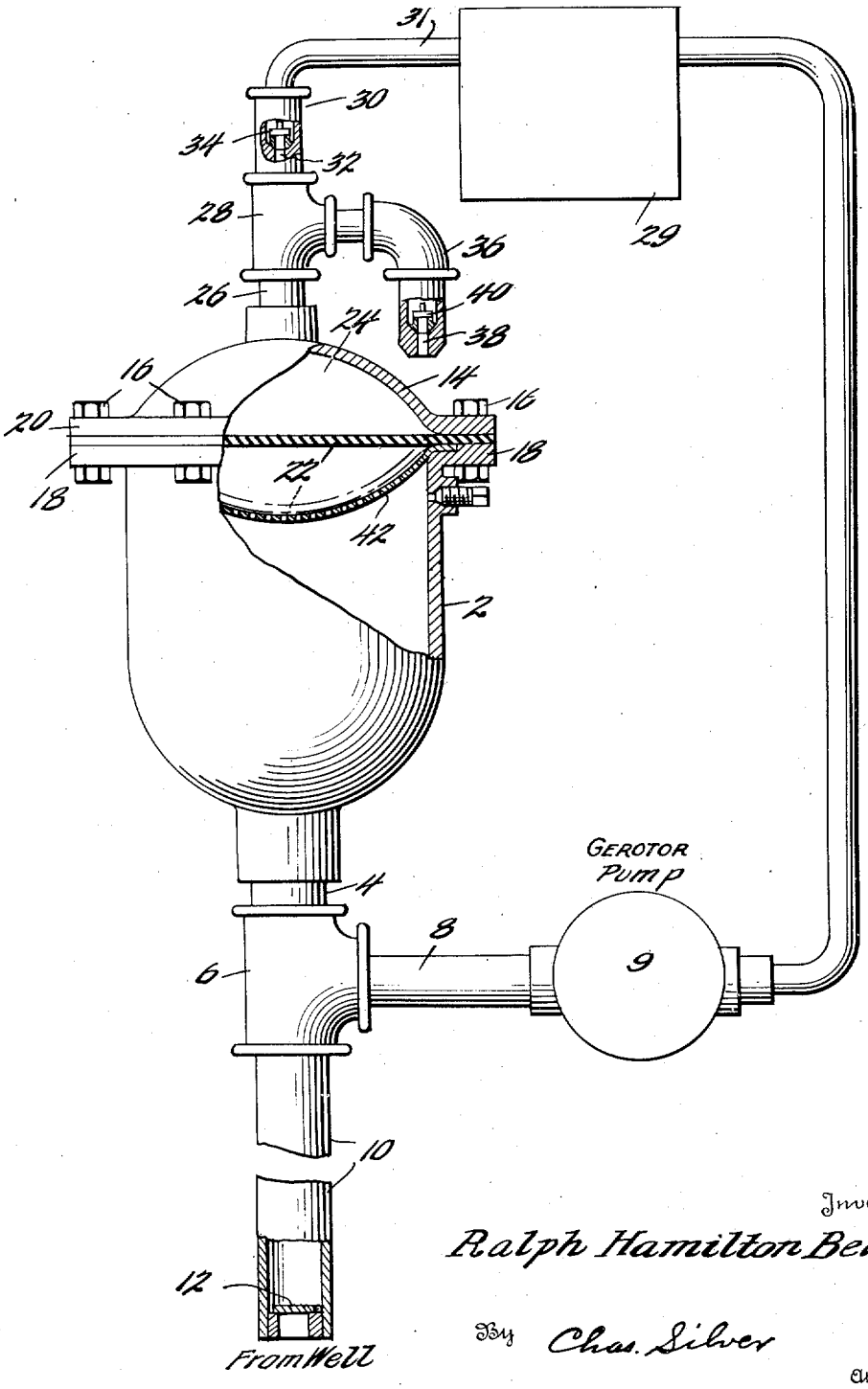
Inventor
Ralph Hamilton Beach,
By Chas. Silver
Attorney Reissued Nov. 29, 1949

Re. 23,170

UNITED STATES PATENT OFFICE 23,170

MEANS FOR ARRESTING CAVITATION IN OPERATION OF PUMPS

Ralph Hamilton Beach, Baltimore, Md., assignor to Gerotor May Corporation, a corporation of Maryland Original No. 2,392,720, dated January 8, 1946, Serial No. 525,492, March 8, 1944. Application for reissue January 7, 1947, Serial No. 720,565

11 Claims. (Cl. 103—1)

This invention relates to water supply systems and has special reference to means for effecting smooth and noiseless operation of said systems with rotary water pumps having negligible slip, for example, Gerotor pumps.

Ordinary rotary pumps operate at high speeds and have much slip or leakage of water. They operate noiselessly but at low efficiency. Pumps having two rotor members, one of which has internal teeth and the other has external teeth disposed within, eccentric to and formed with at least one less tooth division than the first-named rotor, for example, the Gerotor pumps, operate satisfactorily at either high speed or low speed, even when there is little or negligible slip or leakage. By substantial elimination of this slip or leakage, there is a corresponding increase in efficiency. The other rotary pumps do not lend themselves to the close fitting needed to reduce the slip or leakage, owing to their inherent construction.

In using a pump having negligible slip to draw water from a well, the pump must pull the body of water extending from the foot valve at the well to the intake of the pump. In so doing, the pump sets up a condition commonly known as "cavitation." "Cavitation" is the term applied to a breaking up of a mass of water by the reduction of pressure and the pulling apart of the particles of water. This creates a continuing, bubbling condition and attending murmuring sounds having violence of varying intensity. These noises are aggravated by the air in the water, since the water which is drawn by the pump is taken from some source wherein the air contained in the water is at atmospheric pressure and therefore substantial. When Gerotor pumps are used for pumping water, these sounds and noises are extremely violent, resulting in unpleasant condition of operation.

In the systems of water supply for domestic purposes, when the water which is driven into the tank by the pump, carrying an amount of air equivalent to that held by it at a pressure of one atmosphere (approximately 15 pounds per square inch), enters the service tank, the water is at once subjected to the pressure of 20 to 40 pounds maintained in the service tank. The water so introduced into the service tank abstracts air from the air under pressure in the air space present in the tank to an amount equal to that which water under such pressure will take up. It will be clear that if no more air is introduced into the air space above the service tank to compensate for that taken up by the water being driven into the tank, the air space will diminish and vanish.

The function of the air supply in the service tank is to provide a cushion for the water system. For example, if there were no air in the tank and there existed a pressure of 40 pounds per square inch, all of the pressure being due to the water, when a faucet is opened and any water whatever is drawn from the service tank, the pressure would immediately drop, quickly reaching zero. The drop to zero would be due to the non-compressibility and non-elasticity of the water. When the pressure drops to zero the electric switch would start the pump immediately and stop again almost instantly. This would result in the destruction of the pump itself.

To protect the pump against such destruction, air must be supplied, at suitable intervals or regulated volume, into the service tank so that this elastic medium will always be present in the tank and render the system of water supply satisfactory for domestic purposes.

Among the objects of this invention is the provision of a simple, cheap and efficient means for operating the pump without the aforesaid cavitation.

Other, further and more specific objects of this invention will become readily apparent to persons skilled in the art from a consideration of the following description when taken in conjunction with the accompanying drawing.

As shown in the illustration, my invention employs a tank 2 of substantial volume communicating at its bottom through the pipe or conduit 4 with the T-fitting 6. This T-fitting is connected to a conduit 8 leading to the Gerotor pump 9 and also to the conduit 10 extending from a well or source of water supply. Near the bottom of this conduit 10 is located a one-way valve 12. A dome-shaped top or cover 14 is provided for the tank 2 and is fastened thereto by bolts 16 passing through the peripheral flanges 18 and 20, respectively, of the tank 2 and top 14. The tank is separated from its top by an elastic diaphragm 22 made of rubber or other suitable elastic material. This rubber is held between peripheral flanges 18 and 20 and is suitably perforated to receive the bolts 16. The compartment 24 formed by the cover 14 and diaphragm 22 communicates through an opening at its top by means of the conduit 26 with the T-fitting 28. This T-fitting is connected to the service tank 29 by the conduits 30 and 31. Within the conduit 30 is provided a one-way check valve comprising the aperture 32 and valve plug 34 which permits air to pass from the T-fitting 28 into the service tank but does not permit the passage of air in the opposite direction. The T-fitting 28 also connects with the conduit 36 which contains the aperture 38 and valve plug 40.

The operation of my invention is as follows:

The pump 9, when at rest, is connected on its intake side to a standing column of water extending from the pump itself to the foot-valve at the bottom of the well. With my apparatus, there is also present another body of water in tank 2 in communication with the intake side of the pump. The pump 9 which has negligible slip or leakage will, at the moment of its start, draw on the water in tank 2 which flows easily, because of the elastic diaphragm 22, instead of from the conduit 10. The initial demand of the pump will be satisfied by the time the diaphragm reaches the distended position (shown in dotted lines on the drawing), at which time the flow from the well will have responded sufficiently to join the flow from tank 2 and thus satisfy the further demand of the pump. Thus, there is produced a smooth flow of water from the well through the pump and "cavitation" is arrested.

Without the fluid-tight compartment 2 in the pump system, the pump 9 possessing negligible slip will, on starting, act on the column of water extending from the pump itself to the foot-valve in the bottom of the well and cause cavitation. This may be explained as an initial tearing of the water resulting in discontinuous flow to the pump, which discontinuity, once begun, prevails for objectionable time during the operation of the pump. Since the water in the pump contains absorbed air, the tearing apart of the water is accompanied by foaming, and this aggravates the noisy cavitation.

The tank 2 with the flexible diaphragm 22 renders the body of water in tank 2 elastic as a whole by the yield of the diaphragm when the pump starts. I prefer to have the tank 2 close to the pump 9 with at least a substantial part of its volume positioned above the level of the pump. I also prefer to have the diaphragm 22 above the level of the pump. Also, the tank 2 should be of sufficient volume and the diaphragm 22 of sufficient size so that the volume displaced by the inward movement of the diaphragm will be sufficient to make available to the pump when starting the needed quantity of water to establish smooth flow of water therethrough.

If my invention is employed with a service tank as well as a pump in a water supply system, as shown in the drawing, the pulling of the diaphragm 22 into the distended position (shown in dotted lines) results in the simultaneous unseating of valve plug 40 and suction of air through aperture 38 into compartment 24. While the pump is in operation the diaphragm is in the distended state. However, when the motion of the pump is arrested, the aforesaid suction action vanishes and the elastic diaphragm straightens itself from its distended state. In doing so, a substantial amount of the air from the compartment 24 is forced through the aperture 32 and conduits 30 and 31 into service tank 29, since the added pressure produced from the straightening of the diaphragm seats the valve plug 40 and unseats the valve plug 34.

If desired, my invention may be employed to advantage for "anti-cavitation" alone, without the additional purpose of automatically replenishing the air used up from the air space in the service tank, as heretofore described.

In using my invention, satisfactory results are obtained if tank 2 is filled with liquid up to diaphragm 22 when the pump 9 is started. Under such conditions, there will be no air space between the water and diaphragm. However, my device will operate if there is some air between the water and diaphragm when the pump starts, but it is advisable not to start operation with too great an air space. As the pump continues operation, the air from such air space is gradually taken up by the water, and the air space vanishes after the pump operates for a while.

Although a rubber diaphragm is preferable, in lieu thereof, a spring-actuated diaphragm may be employed. Also a combination of rubber diaphragm supplemented by a coil spring may be used within the spirit and scope of this invention. Instead of a diaphragm for the movable portion of the enclosure of tank 2, other movable elements responsive to application and removal of suction, for example a piston, may also be employed.

This application is a continuation-in-part of my application Ser. No. 480,234, filed March 23, 1943, now abandoned.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In combination with a pump having two rotor members, one of which has internal teeth and the other has external teeth disposed within, eccentric to and formed with at least one less tooth division than the first-named rotor, means for arresting cavitation comprising a fluid-tight compartment in communication with the inlet line of the pump, a portion of the enclosure of said compartment being resilient, said resilient portion comprising a movable diaphraghm positioned above the level of the pump, and the volume displaced by the inward movement of said resilient portion of the enclosure being sufficient to make available to the pump when starting the needed quantity of liquid to establish smooth flow of liquid therethrough.

2. In combination with a pump having two rotor members, one of which has internal teeth and the other has external teeth disposed within, eccentric to and formed with at least one less tooth division than the first-named rotor, means for arresting cavitation comprising a fluid-tight compartment close to and in communication with the inlet line of the pump, a portion of the enclosure of said compartment being resilient and positioned above the level of the pump, and the volume displaced by the inward movement of said resilient portion of the enclosure being sufficient to make available to the pump when starting the needed quantity of liquid to establish smooth flow of liquid therethrough.

3. In combination with a pump having two rotor members, one of which has internal teeth and the other has external teeth disposed within, eccentric to and formed with at least one less tooth division than the first-named rotor, means for arresting cavitation comprising a fluid-tight compartment close to and in communication with the inlet line of the pump and having a substantial part of its volume positioned above the level of the pump, a portion of the enclosure of said compartment being disposed to move inwardly upon application of suction to said compartment and thereby permit instantaneous flow of liquid to the pump and to return to the outward position upon discontinuance of suction in said compartment, and the volume displaced by the inward movement of said portion of the enclosure being sufficient to make available to the pump when starting the needed quantity of liquid to establish smooth flow of liquid therethrough.

4. In combination with a pump having two rotor members, one of which has internal teeth and the other has external teeth disposed within, eccentric to and formed with at least one less tooth division than the first-named rotor, means for arresting cavitation comprising a fluid-tight compartment close to and in communication with the inlet line of the pump and having a substantial part of its volume positioned above the level of the pump, a portion of the enclosure of said compartment being resilient and thereby permitting instantaneous flow of liquid to the pump, and the volume displaced by the inward movement of said resilient portion of the enclosure being sufficient to make available to the pump when starting the needed quantity of liquid to establish smooth flow of liquid therethrough.

5. The combination claimed in claim 4, wherein the resilient portion of the enclosure comprises a movable diaphragm positioned above the level of the pump.

6. In combination, a pump, an inlet line thereto, and means for arresting cavitation comprising a fluid-tight compartment in communication with the inlet line of the pump, a portion of the enclosure of said compartment being resilient, and the volume displaced by the inward movement of said resilient portion of the enclosure being sufficient to make available to the pump when starting the needed quantity of liquid to establish smooth flow of liquid therethrough.

7. In combination, a pump, an inlet line thereto, and means for arresting cavitation comprising a fluid-tight compartment in communication with the inlet line of the pump, a portion of the enclosure of said compartment being resilient and positioned above the level of the pump and the volume displaced by the inward movement of said resilient portion of the enclosure being sufficient to make available to the pump when starting the needed quantity of liquid to establish smooth flow of liquid therethrough.

8. In combination, a pump, an inlet line thereto, and means for arresting cavitation comprising a fluid-tight compartment in communication with the inlet line of the pump and having a portion of said compartment disposed to move inwardly upon application of suction to said compartment and thereby permit instantaneous flow of liquid to the pump and to return to the outward position upon discontinuance of suction in said compartment, with means precluding movement of said portion beyond a predetermined limit, and the volume displaced by the inward movement of said portion of the enclosure being sufficient to make available to the pump when starting the needed quantity of liquid to establish smooth flow of liquid therethrough.

9. In combination, a pump having two rotor members, one of which has internal teeth and the other has external teeth disposed within, eccentric to and formed with at least one less tooth division than the first-named rotor, an inlet line thereto, and means comprising a fluid-tight compartment in communication with the inlet line of the pump, a portion of the enclosure of said compartment being resilient, and the volume displaced by the inward movement of said resilient portion of the enclosure being sufficient to make available to the pump when starting the needed quantity of liquid to establish smooth flow of liquid therethrough.

10. In combination, a pump having two rotor members one of which rotors has internal teeth and the other of which has external teeth disposed within eccentric to and formed with at least one less tooth division than the first-named rotor, an inlet thereto, and means comprising a fluid-tight compartment in communication with the inlet of the pump, a portion of the enclosure of said compartment being resilient and comprising a movable diaphragm positioned above the level of the pump, and the volume displaced by the inward movement of said resilient portion of the enclosure being sufficient to make available to the pump when starting the needed quantity of liquid to establish smooth flow of liquid therethrough.

11. In combination with a pump having an inlet thereto, means for arresting cavitation comprising a fluid-tight compartment in communication with the inlet of the pump, a portion of the enclosure of said compartment being resilient and comprising a movable diaphragm, the volume displaced by the inward movement of said resilient portion of the enclosure being sufficient to make available to the pump when starting the needed quantity of liquid to establish smooth flow of liquid therethrough.

RALPH HAMILTON BEACH.

REFERENCES CITED

The following references are of record in the file of this patent:

UNITED STATES PATENTS

| Number | Name | Date |
|---|---|---|
| 1,290,803 | Thoens | Jan. 7, 1919 |
| 1,314,875 | La Bour | Sept. 2, 1919 |
| 1,442,787 | Scheminger | Jan. 16, 1923 |
| 1,965,783 | Traudt | July 10, 1934 |
| 2,183,421 | Brady | Dec. 12, 1939 |
| 2,215,815 | Hartmann | Sept. 24, 1940 |
| 2,220,209 | Carpenter | Nov. 5, 1940 |
| 2,245,546 | McMullen et al. | June 10, 1941 |

FOREIGN PATENTS

| Number | Country | Date |
|---|---|---|
| 4,617 | Great Britain | 1877 |
| 24,397 | Sweden | 1908 |